United States Patent [19]

Gaiser

[11] Patent Number: 4,718,734
[45] Date of Patent: Jan. 12, 1988

[54] DECELERATION AND PRESSURE SENSITIVE PROPORTIONING VALVE

[75] Inventor: Robert F. Gaiser, Stevensville, Mich.

[73] Assignee: Allied Corporation, Morristown, N.J.

[21] Appl. No.: 799,219

[22] Filed: Nov. 18, 1985

[51] Int. Cl.[4] .......................................... B60T 17/04
[52] U.S. Cl. ........................ 303/24 R; 303/6 C; 303/83
[58] Field of Search ................. 303/6 C, 24 F, 24 A, 303/24 C

[56] References Cited

U.S. PATENT DOCUMENTS

| | | | |
|---|---|---|---|
| 3,317,251 | 5/1967 | Hambling et al. | 303/24 A |
| 4,047,765 | 9/1977 | Ulrich, Jr. | 303/24 F |
| 4,093,314 | 6/1978 | Kozakai | 303/24 F |
| 4,196,937 | 4/1980 | Falk | 303/24 F |
| 4,236,760 | 12/1980 | Haar et al. | 303/24 F X |
| 4,595,243 | 6/1986 | Gaiser | 303/6 C |

FOREIGN PATENT DOCUMENTS

| | | |
|---|---|---|
| 3238132 | 4/1984 | European Pat. Off. |
| 0175089 | 3/1986 | European Pat. Off. |
| 2814431 | 10/1979 | Fed. Rep. of Germany |
| 3222730 | 12/1983 | Fed. Rep. of Germany |

*Primary Examiner*—Andres Kashnikow
*Assistant Examiner*—Matthew C. Graham
*Attorney, Agent, or Firm*—Larry J. Palguta; Ken C. Decker

[57] ABSTRACT

A proportioning valve assembly (10, 130) in a housing (12) is pressure responsive to control the flow of fluid to a wheel brake cylinder. The proportioning valve assembly (10, 130) includes a movable retainer (50) coupled with a differential piston (30) for movement therewith, a stationary retainer (70) mounted by the housing (12) and surrounding a second piston (80) having an enlarged diameter portion (88) that defines with an end (11, 16) of the housing (12) a chamber (90). The second piston (80) has a poppet (84) extending into an interior opening (54) of the movable retainer (50), the movable retainer (50) supporting a seal (56) disposed about the extension (82) of the second piston (80). The seal (56) is positioned for closing an opening (73) of the stationary retainer (70) through which the second piston (80) extends. The second piston (80) contains a poppet valve (99) which controls fluid flow through a passage (85) from one side of the second piston (80) to the other side, and the second piston (80) provides support for an inertia-sensitive object (110) which controls operation of the poppet valve (99). When the differential piston (30) and movable retainer (50) move in response to inlet fluid pressure and the seal (56) closes the opening (73) of the stationary retainer (70), fluid on both sides of the enlarged diameter portion (88) of the second piston (80) is isolated from the inlet fluid pressure, and resulting deceleration of the vehicle causes the inertia-sensitive object (110) to move and close the poppet valve (99) to trap fluid pressure within the chamber (90) and prevent further movement of the second piston (80).

32 Claims, 6 Drawing Figures

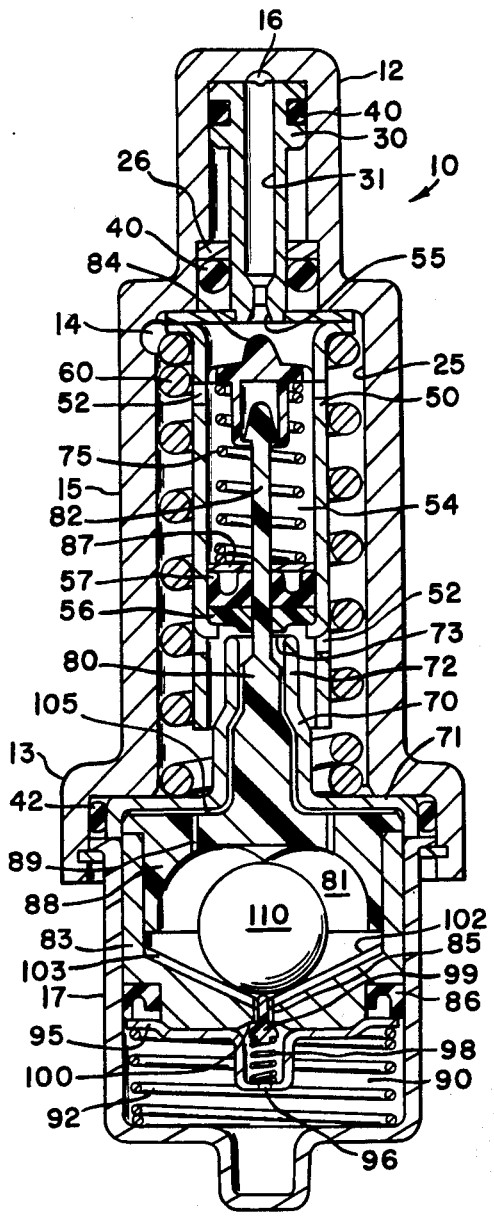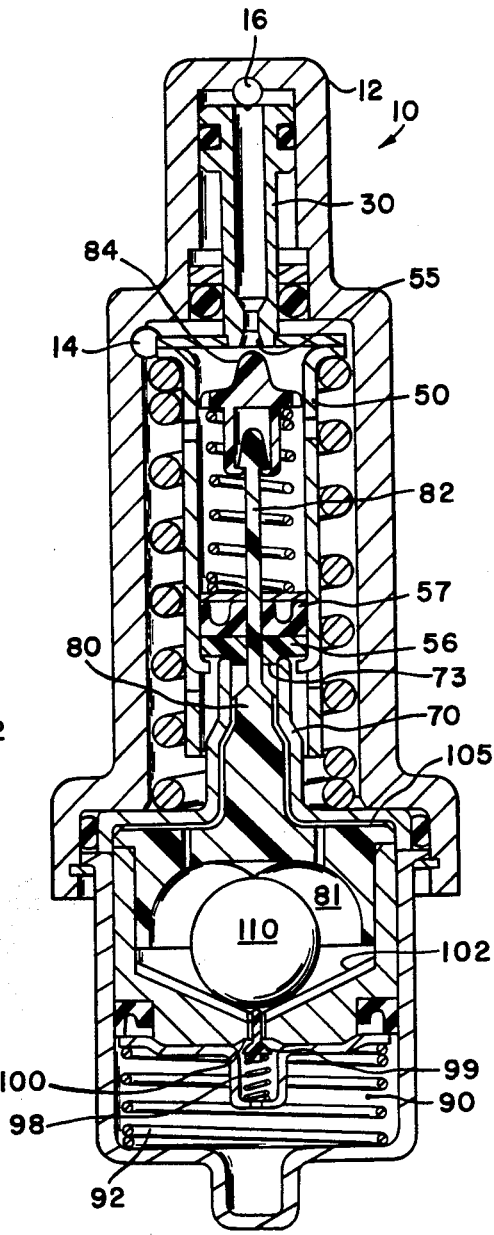
FIG. 1
FIG. 2

DECELERATION AND PRESSURE SENSITIVE PROPORTIONING VALVE

This invention relates to a deceleration and pressure sensitive proportioning valve for the brake system of a vehicle.

U.S. Pat. No. 4,595,243 entitled "DECELERATION AND PRESSURE SENSITIVE PROPORTIONING VALVE" discloses a proportioning valve assembly which may be disposed entirely within the body of the master cylinder, and provides for deceleration and pressure sensitive response in order to reduce fluid pressure communicated to the rear wheels. The proportioning valve assembly includes an inertia-sensitive object disposed within a reservoir, the reservoir communicating by means of a channel with a proportioning valve and fluid flow through the channel controlled by a valve engaged by the inertia-sensitive object. Co-pending patent application Ser. No. 738,116 entitled "DECELERATION AND PRESSURE SENSITIVE PROPORTIONING VALVE WITH HIGH PRESSURE DAMPING" discloses a similar proportioning valve assembly which may be disposed entirely within the body of the master cylinder, or within its own separate housing distinct from the master cylinder but including a reservoir or fluid-containing chamber in which the inertia-sensitive object is object. Ser. No. 738,116 discloses an improvement comprising a sleeve disposed about the end of the second piston in order to provide high pressure damping when there is a "spike" application of the brakes. Co-pending applications Ser. Nos. 738,116 and 850,463 include a channel communicating the fluid reservoir or chamber with the proportioning valve, a valve member being located in the channel and engaged by the inertiasensitive object so that deceleration of the vehicle effects closure of the valve to terminate fluid flow through the channel. A self-contained proportioning valve assembly is disclosed in co-pending patent application No. 924,966, and co-pending Ser. No. 944,079 discloses the combination of a proportioning valve assembly and a torque sensing valve.

It is desirable to provide an entirely self-contained deceleration and pressure sensitive proportioning valve assembly which does not require a reservoir or fluid-containing chamber, be it a reservoir or chamber in the master cylinder or within the housing of the valve assembly, and which likewise eliminates the channel between the reservoir and proportioning valve assembly. The present invention provides a solution by providing an entirely self-contained deceleration and pressure sensitive proportioning valve assembly which may be disposed anywhere in the brake circuit between the master cylinder and wheel brake cylinder. No reservoir or external fluid communication is required in order to replenish the valve assembly, and the channel between the reservoir and second piston of the proportioning valve is eliminated. The proportioning valve assembly may be mounted vertically which eliminates any angular adjustment thereof, and the valve includes inherent high pressure damping in order to compensate for a "spike" application of the vehicle brakes. The invention provides a low cost, easily manufactured valve assembly.

The proportioning valve assembly of the present invention comprises a housing having a stepped bore with a differential piston disposed therein and coupled to a movable retainer for movement therewith. The housing positions a stationary retainer therein, the stationary retainer having an end opening through which a second piston extends into an interior opening of the movable retainer. The movable retainer supports seal means disposed about the extension of the second piston, movement of the differential piston and movable retainer displacing the seal means into sealing engagement with the end opening of the stationary retainer in order to isolate fluid on one side of the stationary retainer from pressure at the inlet of the housing. The second piston has passage means permitting fluid flow from one side of the second piston to the other side thereof, the passage means including poppet valve means controlling fluid flow through the passage means. The poppet valve means is biased by a spring into engagement with an inertia-sensitive object. Fluid passage displacement of the differential piston and movable retainer causes the seal means to close the opening of the stationary retainer and isolate fluid on the one side of the stationary retainer from fluid pressure at the inlet, but permits the second piston to move in response to inlet fluid pressure so that fluid flows from a chamber between the second piston and an end of the housing through the passage means to an area between the stationary retainer and second piston. Deceleration of the vehicle causes the object to move and close the poppet valve means so that fluid no longer flows through the passage means, thus trapping fluid within the chamber and immobilizing the second piston from further movement. An enlarged diameter end of the second piston may include an interior chamber in which the inertia-sensitive object is disposed or may include a mounting member pivotably connected to the secondary piston at one end and the other end carrying the inertiasensitive object.

The accompanying drawings show, for the purpose of exemplification without limiting thereto the invention of the claims, certain practical embodiments illustrating the principles of this invention wherein:

FIG. 1 illustrates in section view the housing having therein the self-contained proportioning valve assembly of the present invention;

FIG. 2 illustrates the proportioning valve assembly of FIG. 1 operating responsively to fluid pressure so that the end opening of the stationary retainer is closed;

Figure 3:
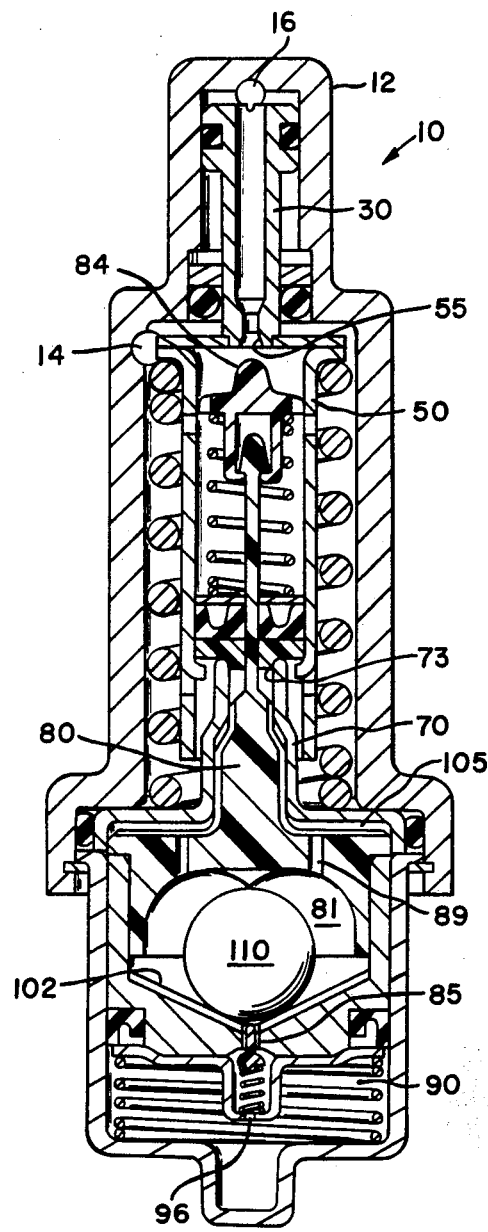
FIG. 3 illustrates the proportioning valve assembly of FIG. 1 with the second piston moving in response to inlet fluid pressure.
Figure 4:
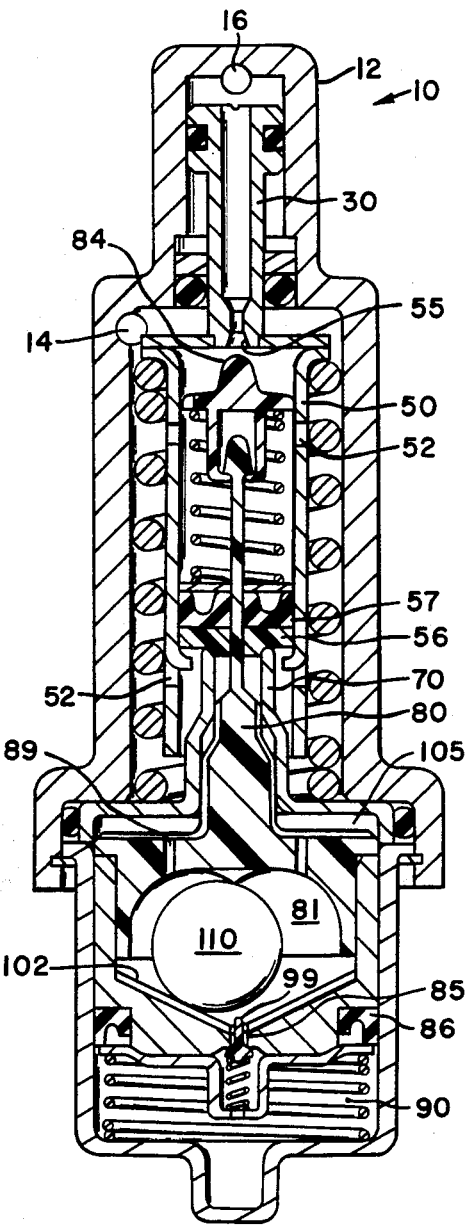
FIG. 4 illustrates movement of the inertia-sensitive object in response to deceleration.

FIGS. 1-4 illustrate the preferred embodiment of the proportioning valve assembly of the present invention and which is designated generally by the reference numeral 10. The proportioning valve assembly 10 is self-contained entirely within a housing 12 that may be disposed separate from the body of the master cylinder (not shown). U.S. Pat. No. 4,595,243 discloses a deceleration and pressure sensitive proportioning valve assembly which may be contained within the body of the master cylinder, and co-pending application Ser. No. 738,116 discloses a deceleration and pressure sensitive proportioning valve assembly which may be contained within its own housing including a reservoir or fluid-containing chamber and high pressure damping sleeve, both co-pending applications being incorporated by reference herein. Alternatively, the present invention is contained within a housing 12 which is separate from the housing of the master cylinder and which does not require a reservoir or a channel communicating with the reservoir. The housing 12 includes a stepped bore 25 containing at one end a differential area piston 30 having therein a through opening 31. Housing 12 includes inlet 14 receiving fluid pressure from the master cylinder (not shown) and an outlet 16 communicating fluid pressure to a vehicle wheel brake assembly. Differential area piston 30 includes seals 40 disposed thereabout, and a stationary collar 26 receives an end of the differential area piston. Differential area piston 30 includes a seat 55 engaging a movable retainer 50 which extends longitudinally within bore 25 and is biased by spring 60 into engagement with differential area piston 30. Retainer 50 includes radial openings 52 which permit fluid pressure to be communicated to interior opening 54, a pair of seals 56 and 57 being carried by retainer 50. Stationary retainer 70 is located at a mid-portion 13 of housing 12, stationary retainer 70 providing a radial or flange portion 71 as a seat for the spring 60. Seal 42 is disposed between the flange 71 and enlarged diameter mid-portion 13 in order to provide a fluid barrier between the upper portion 15 and lower portion 17 of housing 12. Stationary retainer 70 includes a reduced diameter section 72 having an end opening 73 which permits fluid pressure from inlet 14 to be communicated to an interior chamber 90 located in lower portion 17 of the housing. A second piston 80 comprises an extension 82 extending into interior opening 54 of retainer 50 and having coupled to its end a fluted poppet 84 aligned with seat 55. Poppet 84 is biased by spring 75 toward seat 55, the end of spring 75 resting upon collar 87. Extension 82 of second piston 80 is received within reduced diameter section 72 of stationary retainer 70, and is integral with an enlarged diameter portion 88 which has longitudinal passages 89 permitting fluid to be communicated from one side to the other side of piston 80. Second piston 80 includes a cap 83 having a seal 86 disposed thereabout and maintaining in engagement with portion 88 by means of spring 92. Disc 95 is disposed between spring 92 and cap 83, the disc having a central opening 96 permitting fluid communication from chamber 90 through passage 85 to interior chamber 81. Disc 95 provides support for a spring 98 which biases poppet valve means 99 toward poppet valve seat 100 of cap 83. Cap 83 includes circular inclined surface 102 with radial grooves 103 providing a base for inertia-sensitive object 110. Located between the upper side of piston 80 and the lower side of stationary retainer 70 is area 105 which will increase and decrease in size in accordance with longitudinal movement of second piston 80.

Figure 6:
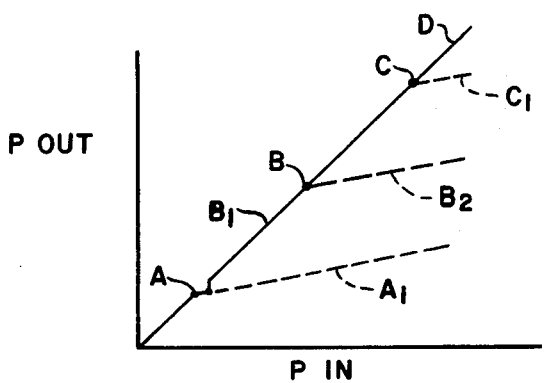
FIG. 6 is a graph of $P_{out}$ vs. $P_{in}$ for the proportioning valve assembly of the present invention.

Proportioning valve assembly 10 operates in accordance with the pressure curves illustrated in FIG. 6, which are the same as the pressure curves illustrated in U.S. Pat. No. 4,595,243. Referring to FIG. 1, as fluid pressure from the master cylinder is communicated through inlet 14 to stepped bore 25, fluid pressure is communicated through radial openings 52 to the interior opening 54, through opening 73 to area 105, through passages 89 to interior chamber 81, and through passage 85 and central opening 96 to chamber 90. Thus, communication is open throughout proportioning valve assembly 10, so that the output pressure ($P_{out}$) equals the input pressure ($P_{in}$). The input pressure rises as the operator applies the vehicle brakes and when it attains a pressure level sufficient to displace differential piston 30, (differential area piston 30 having a larger effective surface area at its upper end than at its lower end where valve seat 55 is located), differential area piston 30 moves downwardly toward poppet 84. Retainer 50 moves downwardly by means of downwardly moving differential area piston 30 so that seal 56 engages and encloses end opening 73 of stationary retainer 70 (see FIG. 2). This closes off communication between the inlet 14 and area 105 which prior to the closing of opening 73 has permitted the bleeding and replenishing of area 105 and interior chamber 90. With increased inlet pressure, the differential area piston 30 continues to move downwardly until valve seat 55 approaches poppet 84 and restricts or meters the outlet pressure (seals 56 and 57 displaceable relative to retainer 50). This establishes the first break point A illustrated to the graph to FIG. 6. If deceleration of the vehicle is sufficient to cause inertia-sensitive object 110 to move up inclined surface 102 (indicating an unloaded vehicle), then poppet valve means 99 closes poppet valve seat 100 by means of the biasing force of spring 98. As a result, pressurized fluid is captured within chamber 90 so that second piston 80 cannot move downwardly and poppet 84 remains stationary and restricts valve seat 55. The input pressure ($P_{in}$) to output pressure ($P_{out}$) relationship would follow the curve A1 indicative of the output pressures communicated to the rear wheel brake cylinders of an unloaded vehicle.

If deceleration of the vehicle is insufficient because the vehicle is loaded and thereby prevents tilting of the vehicle and/or displacement of ball 110 up the inclined surface, poppet valve means 99 remains open and increased input pressure ($P_{in}$) exerted on the smaller diameter extension 82 of second piston 80 causes piston 80 to move downwardly against spring 92. As second piston 80 moves downwardly (see FIG. 3), the poppet 84 follows to open valve seat 55 and permit increased fluid pressure to be communicated to the rear brake. With opening 73 closed, as the second piston 80 moves downwardly fluid transfers from chamber 90 through opening 96, passage 85, chamber 81, and longitudinal passages 89 to area 105. This is illustrated in FIG. 3 which shows second piston 80 moving downwardly to increase the volume of area 105 as fluid is displaced from chamber 90 to area 105. Downward movement of piston 80 results in an increase in the output pressure corresponding to curve B1 of FIG. 6. The increased output pressure ($P_{out}$) provided to the wheel cylinders of the wheel brakes will cause an increase in deceleration of the vehicle such that ball 110 moves up inclined surface 102 (See FIG. 4) and permits closure of poppet valve means 99. The closure of the poppet valve means 99 prevents any fluid communication through passage 85 so that pressurized fluid is trapped within chamber 90 and prevents any further downward movement of second piston 80. Differential area piston 30 will continue to move downwardly as a result of the increased input pressure until seat 55 again approaches poppet 84 (FIG. 4) and establishes the high level break point B for a loaded vehicle. Restriction of fluid flow through valve seat 55 by poppet 84 results in the pressure curve B2 in FIG. 6.

When a braking application ceases, chamber 90 is replenished by lip seal 86, with minimal restriction.

The combination of pressure and deceleration sensing enables the advantages in performance provided by the present invention, such as the higher output pressures illustrated in FIG. 6.

As described in U.S. Pat. No. 4,595,243, the proportioning valve of the present invention does not require a bypass because in a split braking circuit having a master cylinder utilizing two of the proportioning valve assemblies, or in an axle-axle split system with one proportioning valve assembly, an inherent bypass is provided. If the one of the branches of the split circuit should fail, then there would be less deceleration of the vehicle and the poppet valve of the operative branch would stay open so that higher brake fluid pressure received from the master cylinder can be communicated to the associated brake cylinders. Thus, in case of failure, higher brake pressures can be communicated to the associated brake wheel cylinders to effect braking of the vehicle, and likewise for a system with a single proportioning valve assembly. Curve B2 represents also the inherent bypass function characteristic for an unloaded vehicle, while break point C and curve C1 represent the bypass characteristic for a loaded vehicle. Also, by providing for greater travel of the second piston than for the differential area piston, curve "D" may be obtained.

As described in co-pending patent application Ser. No. 738,116, the present invention provides for high pressure damping required in case of a "spike" application of the brakes. During a "spike" application of the brakes, the seal 56 closes opening 73 and the suddenly increasing and high input pressure results in a net upward force on second piston 80 so that piston 80 remains in the position illustrated in the FIG. 1 while differential area piston 30 moves downwardly to restrict seat 55 and restrict braking pressure communicated through outlet 31. Because the amount of fluid to area 105 is controlled, the overshoot tendency which may occur when a "spike" application of the brakes occurs, is restricted.

Figure 5:
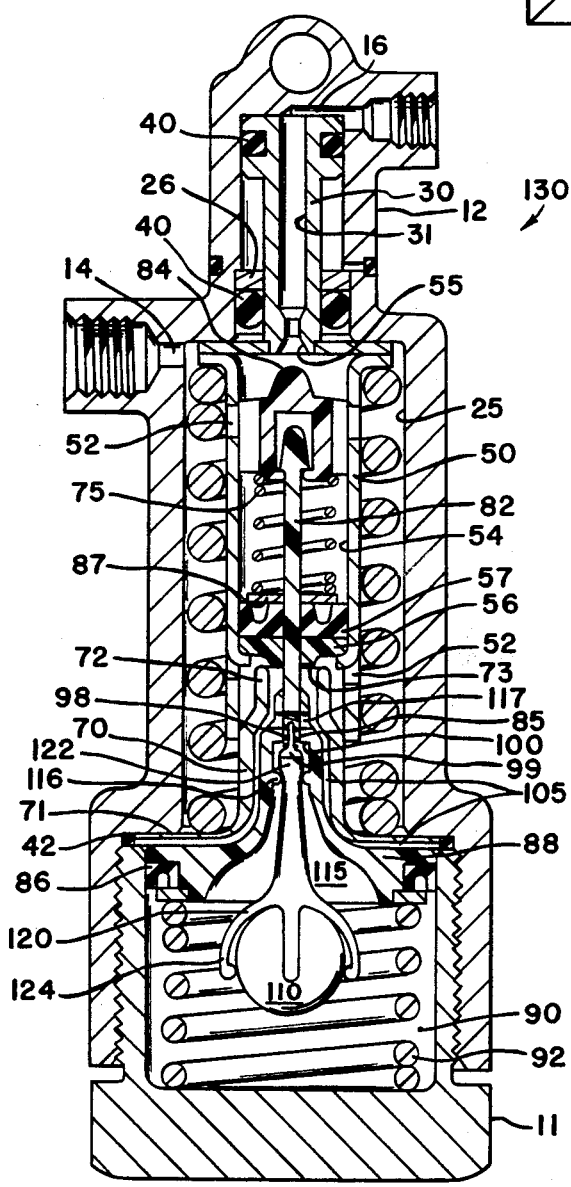
FIG. 5 illustrates an alternative embodiment of the present invention.

Referring to FIG. 5, there is illustrated an alternative embodiment 130 of the proportioning valve assembly of the present invention. Where applicable, like components will be referred to by the same numerals utilizes in reference to the preferred embodiment. The housing 12 is enclosed by a threaded cap 11 and contains a stepped bore 25 having therein the following same components as previously illustrated: inlet 14; outlet 16; differential area piston 30; through opening 31; seals 40; collar 26; retainer 50; radial openings 52; interior opening 54; seat 55; seals 56 and 57; poppet 84; piston extension 82; enlarged diameter portion 88; spring 75; collar 87; opening 73; stationary retainer 70; flange 71; seal 42; reduced diameter section 72; area 105; chamber 90; spring 92; seal 86; passage 85; poppet valve seat 100; ball 110; poppet valve means 99; and spring 98. The second piston 80 has a cavity 115 which receives therein poppet valve means 99 that is biased downwardly by spring 98 into engagement with a pivotable portion 122 of the pivotable mounting member 120. Pivotable mounting member 120 includes a plurality of fingers 124 which surround and couple thereto ball 110. The second piston 80 includes inward radial projections 116 which trap the pivotal projection 122 for engagement with poppet valve means 99. Member 120 provides a pendulum suspending ball 110 within chamber 90. Second piston 80 includes passages 117 which permit fluid to flow through opening 73, passage 85, poppet valve means 99, and into chamber 90.

The proportioning valve assembly 130 provides a pendulum suspended ball 110 for operating poppet valve means 99 as a function of the deceleration of the vehicle. Proportioning valve assembly 130 operates in the same manner as described for the preferred embodiment, and produces the output curve characteristics illustrated in FIG. 6. When increase fluid pressure is communicated from the master cylinder (not shown) to inlet 14, the increased pressure is communicated freely through radial openings 52 to interior opening 54, through opening 73 to area 105, and through passages 117 and 85 past poppet valve means 99 to chamber 90. The increased pressure causes differential area piston 30 to move downwardly toward poppet 84. As the differential area piston 30 moves downwardly, the seal 56 is brought into engagement with opening 73 to close the opening and prevent the increased fluid pressure from communicating with the area 105. If the vehicle is unloaded, further downward movement of the differential area piston 30 causes fluid flow through the opening 31 to be restricted as seat 55 approaches poppet 84. This produces the break point A illustrated in FIG. 6, and if sufficient deceleration occurs, the ball 110 which is multi-directionally suspended, will swing and cause poppet valve means 99 to close poppet valve seat 100 so that fluid pressure is trapped within chamber 90 and piston 80 cannot move downwardly. The input pressure-to-output pressure relationship would follow the curve A1 indicative of output pressures communicated to the rear wheel brake cylinders of an unloaded vehicle. If deceleration of the vehicle is insufficient because the vehicle is loaded and thereby prevents tilting of the vehicle and the resulting swinging or displacement of ball 110, then poppet valve means 99 remains open and permits the second piston 80 to move downwardly which displaces fluid from chamber 90 through and past poppet valve means 99, passages 85 and 117, to area 105. This permits poppet 84 to be retracted away from seat 55 and allow output pressures to be communicated in accordance with curve B1 of FIG. 6. The increased output pressures provided to the wheel cylinders of the rear brakes will cause an increase in deceleration of the vehicle such that the ball 110 will swing and effect closure of poppet valve means 99 and trap fluid within chamber 90 so that second piston 80 no longer moves downwardly, which causes poppet 84 to remain stationary and effect the restriction of fluid flow through seat 55 as differential area piston 30 moves downwardly. This establishes the higher level break point B for a loaded vehicle and the restriction of fluid pressure through seat 55, opening 31 and outlet 16, that will follow curve B2 of FIG. 6.

It is readily apparent that the bypass characteristics and high pressure damping characteristics are identical to that described previously for the preferred embodiment. The poppet valve spring 98 serves the multiple functions of retaining poppet valve means 99 in an open mode during low acceleration, and determining the deceleration at which the pendulum or member 120 will be able to close poppet valve means 99 in response to deceleration of the vehicle.

Although this invention has been described in connection with the illustrated embodiments, it will be obvious to those skilled in the art that various changes may be made in the form, structure, and arrangement of parts without departing from the invention and the scope of the claims appended hereto.

I claim:

1. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a retainer member connected with said differential piston for movement therewith, a second piston disposed within said housing and movable relative to said differential piston, a fluid chamber defined between and end of said housing and said second piston, said second piston connected with a poppet disposed adjacent said differential piston for cooperation therewith, passage means extending through said second piston, seal means disposed about said second piston and for isolating said chamber from the pressure at said inlet, a stationary retainer secured to said housing and disposed about said second piston, the stationary retainer in position for engagement with said seal means disposed about the second piston and defining with said second piston an area for receiving fluid transmitted from said chamber through said passage means, poppet valve means for controlling fluid flow through said passage means, and an inertia-sensitive object engaging said poppet valve means, the inertia-sensitive object being responsive to deceleration of the vehicle to effect closure of said poppet valve means to prevent fluid communication through said passage means and cooperate in reducing the pressure at said outlet.

2. The pressure reducing valve assembly in accordance with claim 1, wherein said differential piston has a through passage with an opening at one end disposed adjacent the poppet.

3. The pressure reducing valve assembly in accordance with claim 1, wherein the inertia-sensitive object comprises a ball.

4. The pressure reducing valve assembly in accordance with claim 1, wherein said inertia-sensitive object may move multi-directionally.

5. The pressure reducing valve assembly in accordance with claim 1, further comprising a spring disposed between said retainer member and stationary retainer in order to bias the retainer member toward said differential piston.

6. The pressure reducing valve assembly in accordance with claim 1, wherein said poppet is coupled to said second piston by resilient means which biases the poppet into engagement with said second piston.

7. The pressure reducing valve assembly in accordance with claim 6, wherein said resilient means biases said seal means toward an opening of said stationary retainer.

8. The pressure reducing valve assembly in accordance with claim 1, wherein said poppet and second piston extend into an interior opening of said retainer member.

9. The pressure reducing valve assembly in accordance with claim 1, wherein the second piston includes an interior chamber having said inertia-sensitive object disposed thereat.

10. The pressure reducing valve assembly in accordance with claim 9, wherein said interior chamber includes an inclined surface upon which said inertiasensitive object is positioned in order to effect the engagement with said poppet valve means and permit fluid flow through the passage means when the vehicle is not decelerating.

11. The pressure reducing valve assembly in accordance with claim 10, wherein said passage means includes openings extending through an enlarged diameter portion of said second piston in order to provide fluid communication with said interior chamber.

12. The pressure reducing valve assembly in accordance with claim 11, further comprising a second spring disposed between the housing and said second piston in order to bias the second piston toward said differential piston.

13. The pressure reducing valve assembly in accordance with claim 9, wherein said poppet valve means is open and permits flow through the poppet valve means to the interior chamber during initial deceleration of the vehicle.

14. The pressure reducing valve assembly in accordance with claim 1, wherein the poppet valve means is biased by a spring disposed between the poppet valve means and second piston.

15. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a retainer member connected with said differential piston for movement therewith, a second piston disposed within said housing and movable relative to said differential piston, a fluid chamber defined between an end of said housing and said second piston, said second piston connected with a poppet disposed adjacent said differential piston for cooperation therewith, passage means extending through said second piston, poppet valve means for controlling fluid flow through said passage means, the poppet valve means biased by a spring disposed between said poppet valve means and second piston, an inertia-sensitive object engaging said poppet valve means, the object including a mounting member having at one end means for coupling thereto an inertia-sensitive member and at the other end a pivotable portion engaging said poppet valve means, the pivotable portion pivotably mounted with said secondary piston so that deceleration of the vehicle causes movement of said inertia-sensitive member and pivoting of the pivotable portion which engages the poppet valve means, and the inertia-sensitive object being responsive to deceleration of the vehicle to effect closure of said poppet valve means to prevent fluid communication through said passage means and cooperate in reducing the pressure at said outlet.

16. The pressure reducing valve assembly in accordance with claim 15, wherein pivoting of the pivotable portion effects movement of the poppet valve means against said spring to close said passage means and isolate the fluid chamber so that fluid is trapped therein.

17. The pressure reducing valve assembly in accordance with claim 16, wherein the second piston includes an enlarged diameter end, the enlarged diameter end shaped complementary with said mounting member in order to permit multi-directional movement thereof.

18. The pressure reducing valve assembly in accordance with claim 17, wherein the second piston includes radial extensions which maintain the pivotable portion in engagement with said poppet valve means and provide the pivotable mounting.

19. In a vehicular proportioning valve assembly having an inlet communicating with a fluid pressure source and an outlet communicating with a brake assembly, a pressure responsive assembly disposed in a housing and cooperating with the inlet and the outlet to vary fluid communication therebetween in response to pressurized fluid communicated to the inlet, and an inertia-sensing mass responsive to deceleration of the vehicle and cooperating with the pressure responsive assembly to assist in the variation of fluid communication between the inlet and outlet, the improvement comprising the pressure responsive assembly including a differential piston coupled with a movable retainer for movement therewith and the movable retainer having seal means, a second piston aligned with the movable retainer and having a poppet cooperating with the differential piston, stationary retainer means having an opening aligned with said seal means which moves with said movable retainer to close said opening and prevent fluid communication from said inlet to a fluid chamber defined by said second piston and an end of the housing of the proportioning valve assembly, and the inertia-sensing mass engaging said second piston.

20. The proportioning valve assembly in accordance with claim 19, wherein said second piston has the poppet coupled thereto by resilient means.

21. The proportioning valve assembly in accordance with claim 19, further comprising a spring disposed between said movable retainer and stationary retainer means in order to bias the movable retainer toward said differential piston.

22. The proportioning valve assembly in accordance with claim 19, wherein said second piston includes an extension with the poppet coupled thereto and the extension extending into an interior opening of said movable retainer so that said poppet is disposed adjacent a through opening in said differential piston.

23. The proportioning valve assembly in accordance with claim 22, wherein the poppet, extension, and seal means are disposed within the interior opening of said movable retainer.

24. The proportioning valve assembly in accordance with claim 19, wherein the second piston includes passage means and the second piston and stationary retainer means define therebetween an area for receiving fluid transmitted from said fluid chamber through the passage means to said area.

25. The proportioning valve assembly in accordance with claim 24, wherein the passage means includes poppet valve means for controlling fluid flow through said passage means, the poppet valve means engaged by said inertia-sensing mass.

26. The proportioning valve assembly in accordance with claim 25, wherein said inertia-sensing mass may move multi-directionally in response to deceleration of the vehicle in order to effect closure of said poppet valve means and prevent fluid flow through the passage means.

27. The proportioning valve assembly in accordance with claim 26, wherein said stationary retainer means is shaped complementary to and surrounds a portion of said second piston.

28. The proportioning valve assembly in accordance with claim 27, wherein said second piston includes an enlarged diameter end having an interior cavity therein, the cavity communicating with said fluid chamber by means of said poppet valve means.

29. The proportioning valve assembly in accordance with claim 28, wherein said inertia-sensing means comprises a ball disposed within said interior cavity and resting upon a circular inclined surface so that said ball engages said poppet valve means.

30. The proportioning valve assembly in accordance with claim 25, wherein said second piston includes an enlarged diameter end having an interior cavity therein, the cavity communicating with said area by means of said poppet valve means.

31. In a vehicular proportioning valve assembly having an inlet communicating with a fluid pressure source and an outlet communicating with a brake assembly, a pressure responsive assembly cooperating with the inlet and the outlet to vary fluid communication therebetween in response to pressurized fluid communicated to the inlet, and an inertia-sensing mass responsive to deceleration of the vehicle and cooperating with the pressure responsive assembly to assist in the variation of fluid communication between the inlet and outlet, the improvement comprising the pressure responsive assembly including a differential piston coupled with a movable retainer for movement therewith and the movable retainer having seal means, a second piston aligned with the movable retainer and having a poppet end cooperating with the differential piston, stationary retainer means having an opening aligned with said seal means which moves with said movable retainer to close said opening and prevent fluid communication from said inlet to a fluid chamber defined by said second piston and an end of a housing of the proportioning valve assembly, the second piston including passage means and the second piston and stationary retainer means defining therebetween an area for receiving fluid transmitted from said fluid chamber through the passage means to said area, the passage means including poppet valve means for controlling fluid flow through said passage means, the poppet valve means engaged by said inertia-sensing mass, said second piston including an enlarged diameter end having an interior cavity therein, the cavity communicating with said area by means of said poppet valve means, the inertia-sensing mass engaging said second piston, and said mass including a mounting member having at one end thereof an inertia-sensitive weight and at the other end a pivotable end pivotably connected to said second piston and engaging the poppet valve means.

32. The proportioning valve assembly in accordance with claim 31, wherein the poppet valve means is biased by a spring into engagement with said pivotable end, movement of the pivotable end in response to movement of the inertia-sensitive weight causing said poppet valve means to move toward said differential piston and effect closure of said passage means.

* * * * *